US010452052B2

(12) United States Patent
Rogers et al.

(10) Patent No.: US 10,452,052 B2
(45) Date of Patent: Oct. 22, 2019

(54) METHOD AND SYSTEM FOR PROCESSING MACHINE DATA BEFORE COMPLETION OF MACHINING

(71) Applicant: Autodesk, Inc., San Rafael, CA (US)

(72) Inventors: Nathan David Rogers, Rugeley (GB); Paul Wilkinson, Studley (GB); Joseph George Lambourne, London (GB)

(73) Assignee: Autodesk, Inc., San Rafaek, CA (US)

( * ) Notice: Subject to any disclaimer, the term of this patent is extended or adjusted under 35 U.S.C. 154(b) by 133 days.

(21) Appl. No.: 15/649,530

(22) Filed: Jul. 13, 2017

(65) Prior Publication Data

US 2019/0018391 A1 Jan. 17, 2019

(51) Int. Cl.
*G05B 19/4097* (2006.01)

(52) U.S. Cl.
CPC .......... *G05B 19/4097* (2013.01); *G05B 2219/33141* (2013.01); *G05B 2219/35012* (2013.01)

(58) Field of Classification Search
None
See application file for complete search history.

(56) References Cited

U.S. PATENT DOCUMENTS

| | | | | |
|---|---|---|---|---|
| 2013/0282162 A1* | 10/2013 | Griggs | .................. | G05B 19/401 700/190 |
| 2013/0304248 A1* | 11/2013 | Lange | .................... | G05B 19/18 700/175 |
| 2015/0026107 A1* | 1/2015 | Vijayaraghavan | ..... | G06Q 10/06 706/12 |
| 2018/0299865 A1* | 10/2018 | Holmstrom | .......... | G05B 19/414 |

OTHER PUBLICATIONS

Unknown author, "MTConnect®—A Free, Open Standard for the Factory," (© 2018) [online] (retrieved from https://www.mtconnect.org/), 3 pages.
Unknown author, "Kepware®—Fanuc Focas Ethernet," (© 2019) [online] (retrieved from https://www.kepware.com/en-us/products/kepserverex/drivers/fanuc-focas-ethernet/), 6 pages.

(Continued)

*Primary Examiner* — Mohammad Ali
*Assistant Examiner* — Vincent W Chang
(74) *Attorney, Agent, or Firm* — Fish & Richardson P.C.

(57) ABSTRACT

Systems and method relating to machining parts include a CNC system, and a computer including a processor and a computer-readable medium, wherein the computer-readable medium encodes instructions including receiving, at the computer program, output data from a CNC machine that receives instructions of a Numerical Control (NC) program at a computer of the CNC machine, the instructions causing the CNC machine to i) manufacture a part, and ii) output the output data, parsing, by the computer program, the output data before completion of the manufacturing of the part by the CNC machine in accordance with the instructions of the NC program, selecting, by the computer program and based on one or more predetermined parameters, a set of data from the parsed output data; and providing, by the computer program to a remote system, the set of data for processing to facilitate machining using the CNC machine.

20 Claims, 5 Drawing Sheets

(56) References Cited

OTHER PUBLICATIONS

Julian Renz, "Heidenhain's TNCremo PC Software is Now Available for Online Download," (Oct. 3, 2016) (© 2019) [online] (retrieved from https://www.heidenhain.us/resources-and-news/heidenhains-tncremo-pc-software-now-available-online-download/), 5 pages.
Unknown author, "Authentise—3DIAX Additive Manufacturing Automation," (© 2019) [online] (retrieved from https://authentise.com/), 9 pages.
Celia Cadwallader, "Delcam Incorporates Machine DNA Profiler into PowerMill 2013," (Nov. 30, 2012) [online] (retrieved from http://www.machinery.co.uk/machinery-products/delcam-dna-profiler-powermill-2013-cadcam), 4 pages.
Unknown author, "GitHub—RobotExMachina/Machina NET: A Library for Real-time Robot Control," (Mar. 26, 2019) [online] (retrieved from https://github.com/RobotExMachina/Machina.NET), 4 pages.
Guralnik and Srivastava, "Event Detection from Time Series Data," (1999) [online] (retrieved from http://citeseerx.ist.psu.edu/viewdoc/download?doi=10.1.1.112.1040&rep=rep1&type=pdf), 10 pages.
Patrick Jahnke, "Machine Learning Approaches for Failure Type Detection and Predictive Maintenance," (Jun. 19, 2015) [online] (retrieved from https://www.ke.tu-darmstadt.de/lehre/arbeiten/master/2015/Jahnke_Patrick.pdf), 83 pages.
Unknown author, Lemoine Technologies, "Machine Monitoring—Lemoine Automation," (Apr. 1, 2019) [online] (retrieved from http://www.lemoineautomation.com/), 2 pages.

\* cited by examiner

METHOD AND SYSTEM FOR PROCESSING MACHINE DATA BEFORE COMPLETION OF MACHINING

BACKGROUND

This specification relates to processing output data from a Computer Numerical Control (CNC) machine before completing machining of a particular work piece.

CNC machines operate by reading sets of instructions, or tape files, that provide control information such as coordinates, or tool paths, feed rates, or spindle speeds to guide the machining of a particular work piece. Traditional methods of creating tool paths for machining parts include simple tape files, which provide pre-calculated tool paths based on a Computer Aided Design (CAD) drawing provided. However, a variety of factors affect the machining process and should be accounted for in a tape file in order to correct the cutting, make adjustments during the machining process, or alert an operator of the CNC machine of the status of the machining process during the process of machining a particular work piece.

CNC machines are able to output data. Typically, however, outputting data from a CNC machine involves use of proprietary control systems that include complicated hardware and software components. Such proprietary systems have two disadvantages: first, the systems generally require careful integration on a controller of the CNC machine; and second, the systems are expensive and difficult to retrofit to existing machines. In some cases, it is not possible to add new data output functionality to aging machines that were not originally configured for use with such control systems.

SUMMARY

This specification describes systems and methods relating to processing output data from a CNC machine. Programs used to generate numerical control (NC) programs for CNC machines can insert instructions into a tape file being read by a controller of the CNC machine. These instructions, or markers, instruct the CNC machine to provide output data. The output data can include current operating conditions of the CNC machine. In particular, a simple software utility can be used with one or more machine tool controllers of a CNC machine to identify, reformat as needed for transmission, and transmit data that is output from the CNC machine.

In general, one or more aspects of the subject matter described in this specification can be embodied in a method including receiving, at a computer program, output data from a Computer Numerical Control (CNC) machine that receives instructions of a Numerical Control (NC) program at a computer of the CNC machine, the instructions causing the CNC machine to i) manufacture a part, and ii) output the output data. The method includes parsing, by the computer program, the output data before completion of the manufacturing of the part by the CNC machine in accordance with the instructions of the NC program. The method includes selecting, by the computer program and based on one or more predetermined parameters, a set of data from the parsed output data. The method includes providing, by the computer program to a remote system, the set of data for processing to facilitate machining using the CNC machine.

Aspects of this embodiment may include one or more of the following features. In some implementations, the computer program is a simple software utility that i) runs on the CNC machine, and ii) communicates with a Computer Aided Manufacturing (CAM) program that generates the instructions of the NC program. In some implementations, the remote system is a computer system that runs a Computer Aided Manufacturing (CAM) program that generates the instructions of the NC program. The NC program can be a first NC program, and the method can include providing, by the computer program and to the CAM program, control information to cause the CAM program to insert output commands into a second NC program while the CAM program generates the second NC program, the output commands causing the CNC machine to output the output data.

The output commands can be markers that cause the CNC machine to perform actions such as taking a measurement. The measurement data is output by the CNC machine based on the markers inserted into the tape file read by the controller of the CNC machine. Each of the markers can have an identifier that is used to match specific measurements with an exact location within the CAM program which generated the cutting move which was being executed when the measurement was taken. For example, a marker that causes the CNC machine to output measurement data at a particular point in a toolpath can have an identifier that corresponds to an identifier within the CAM program at 20% through the toolpath.

In some implementations, the remote system is a server, and the processing includes analysis of the set of data. In some implementations, the data is output to a file. In some implementations, the data is output through a data output port of the CNC machine.

In some implementations, the parsing of the output data is performed as the output data is received. In some implementations, the set of data includes reporting data. The method can include receiving, by the computer program, a request for the reporting data from a remote client device, and in response to at least one of receiving the request or determining that a predetermined period of time has transpired, transmitting, to the remote client device, the reporting data, wherein the reporting data includes a progress status of the NC program.

The method can include receiving, by the computer program, at least one of: a request for the reporting data from a remote client device or alert data from the CNC machine, and in response to receiving at least one of: the request or the alert data, transmitting, to the remote client device, the reporting data, wherein the reporting data includes at least one of: a feed rate of the CNC machine, a spindle speed of the CNC machine, or a status of coolant use by the CNC machine.

The method can include receiving, by the computer program, at least one of: a request for the reporting data from a remote client device or alert data from the CNC machine, and in response to receiving the request, transmitting, to the remote client device, the reporting data, wherein the reporting data includes tooling data of the CNC machine.

The method can include receiving, by the computer program, at least one of: a request for the reporting data from a remote client device or alert data from the CNC machine, and in response to receiving the request, transmitting, to the remote client device, the reporting data, wherein the reporting data includes stock material data of the part being manufactured by the CNC machine.

The method can include receiving, from a user, one or more types of data to be output by the CNC machine, and determining, by the computer program and based on the one or more types of data, the one or more predetermined parameters used to select the set of data from the parsed output data.

In addition, one or more aspects of the subject matter described in this specification can be embodied in a system that includes one or more computers programmed to generate a Numerical Control (NC) program to manufacture a part using a Computer Numerical Control (CNC) machine and to provide output data related to the manufacturing of the part. The CNC machine can be configured to run the NC program to manufacture the part and to provide the output data, wherein the CNC machine includes one or more storage devices encoding instructions of an additional computer program that runs on the CNC machine, parses the output data before completion of the manufacturing of the part by the CNC machine in accordance with the instructions of the NC program, selects a set of data from the parsed output data based on one or more predetermined parameters, and provides the set of data to a computer remote from the CNC machine for processing to facilitate machining using the CNC machine.

The CNC machine can use markers on tape files to determine what parameters to output. These markers, as described above, have identifiers that correspond to particular locations within the CAM program that generates the NC program. The markers can also be used to select a set of data from the parsed output data. For example, based on the identifiers of the markers, specific measurements to be output in a report can be identified.

In some implementations, the computer remote from the CNC machine analyzes the set of data using machine learning, detects a machine event based on the analyzing, and provides data indicating the machine event to the software program. The analyzing can include evaluating, based on historical output data from the output port of the CNC machine received from the software program, the set of data, assigning, based on the evaluation, one or more abnormality scores to the set of data for each of one or more events indicated by the set of data, and outputting, based on the assigned one or more abnormality scores for each of the one or more events indicated by the set of data, an event report. The detecting can include determining, using the event report, that an aberration has occurred, wherein the machine event is an abnormal machine event.

In some implementations, the computer remote from the CNC machine is an analysis server. In some implementations, the additional computer program is a software utility that communicates with a Computer Aided Manufacturing (CAM) program that generates the instructions of the NC program.

In some implementations, the computer remote from the CNC machine is a computer that runs a Computer Aided Manufacturing (CAM) program that generates the instructions of the NC program.

Particular embodiments of the subject matter described in this specification can be implemented to realize one or more of the following advantages. Because the proposed method of parsing and analyzing CNC output data does not require complex software modifications to a machine tool controller of a CNC machine or hardware additions to the CNC machine, the method provides affordable functionality for monitoring and on-the-fly adjustments to NC programs to most CNC machines.

Known data associated with a CNC machine can continually be updated using data gathered through the proposed method, and the updated data can be used to build a profile specific to the machine, improving the accuracy of future machine simulations and NC programs. Additionally, improved machining simulations facilitate more accurate projected finish times for a job.

The proposed method includes learning from historical data and adjustments, improving efficiency and accuracy of jobs executed by a particular CNC machine by tailoring NC programs and operating parameters to the CNC machine.

Furthermore, the proposed method provides feedback to an operator through various techniques, including visual and audible presentations. The feedback allows him to easily identify areas of an NC program for improvement and to understand the adjustments and options available.

The insertion of markers into a tape file by CAM software, described in further detail below, allows the CAM software to request that measurements be recorded at known locations within the toolpath. For example, an operator can record a spindle load at exactly the moment the tool starts to engage with the stock, because the spindle load is likely to spike for a fraction of a second at that moment. Other machine tool data collection systems might just record data at regular intervals, and may miss sharp spikes in the output at times when most tool wear is taking place (e.g., when the tool engages with the stock).

Markers in the tape file can each have an identifier which will be stored in the CAM system and will also appear in the data which is being collected. When the collected data is analyzed, the identifier can be used to match a specific measurement with the exact location in the CAM system's internal data structure which generated the cutting move which was being executed. In other machine tool data collection systems, which simply record measurements at regular intervals, there is no easy way to link a given measurement with the instructions in the CAM system which generated the machine movement taking place when the data was recorded.

Because the CAM system can specify the times when measurements are made, the system reduces the amount of data which needs to be sent over the network and stored on servers. The CAM system may only be interested in a small number of measurements at specific locations; in contrast, collecting data at regular time intervals forces all that information to be sent across the network and stored.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
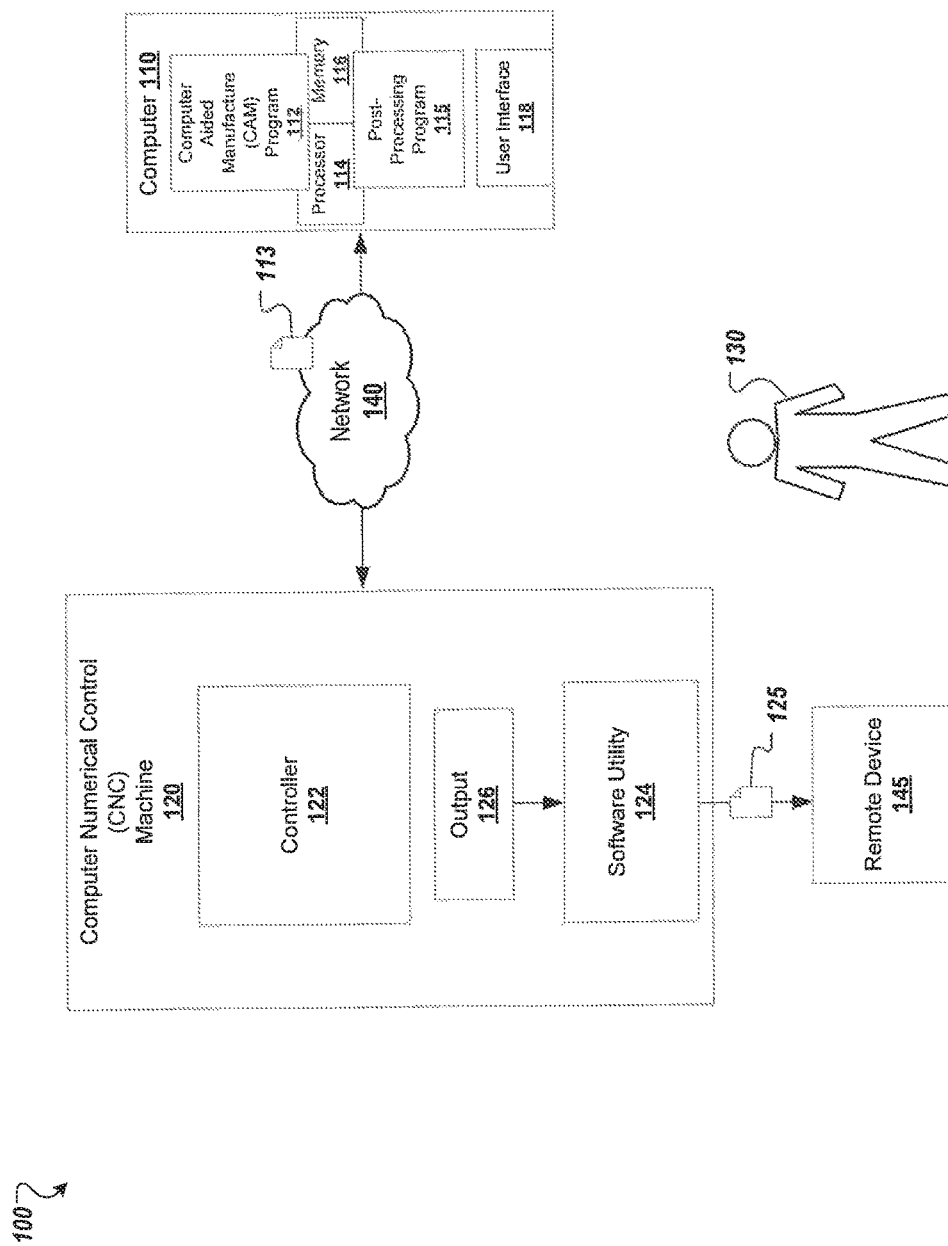
FIG. 1 shows an example of a system for outputting data from a Computer Numerical Control (CNC) machine to a local software program for processing.
Figure 2:
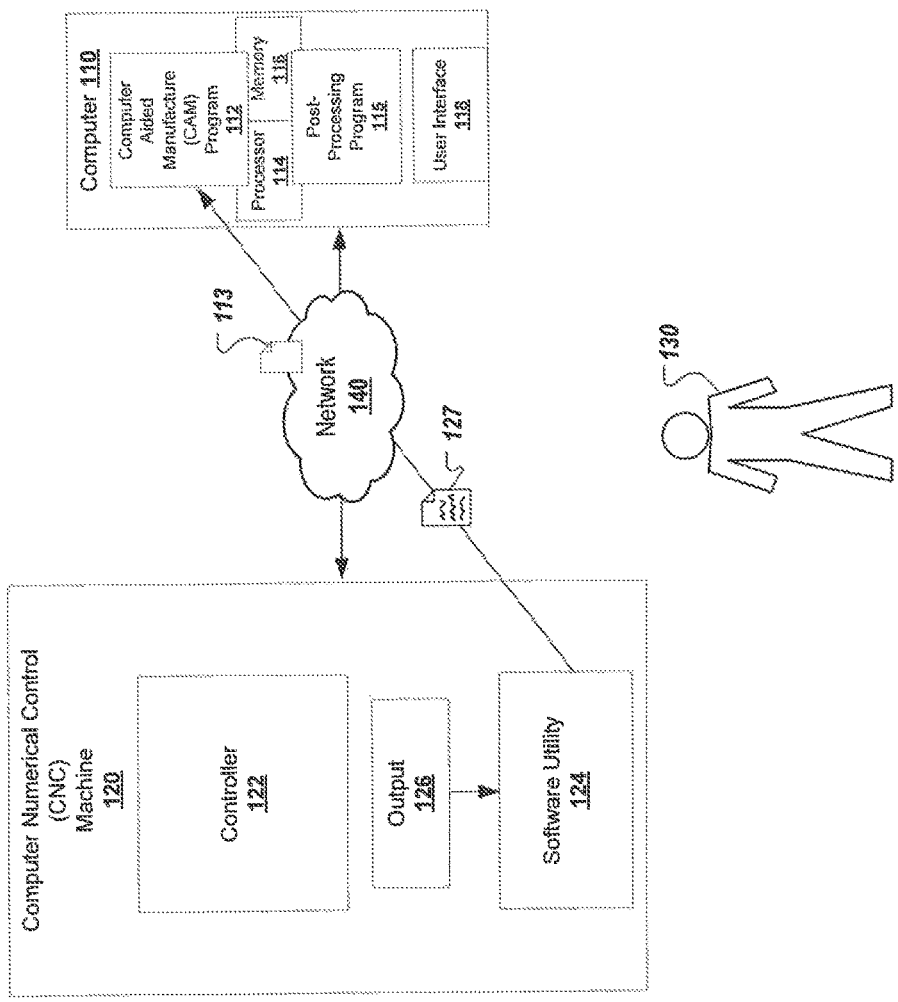
FIG. 2 shows an example of a system for outputting data from a CNC machine to a Computer Aided Manufacturing (CAM) program that generates instructions for the CNC machine.
Figure 3:
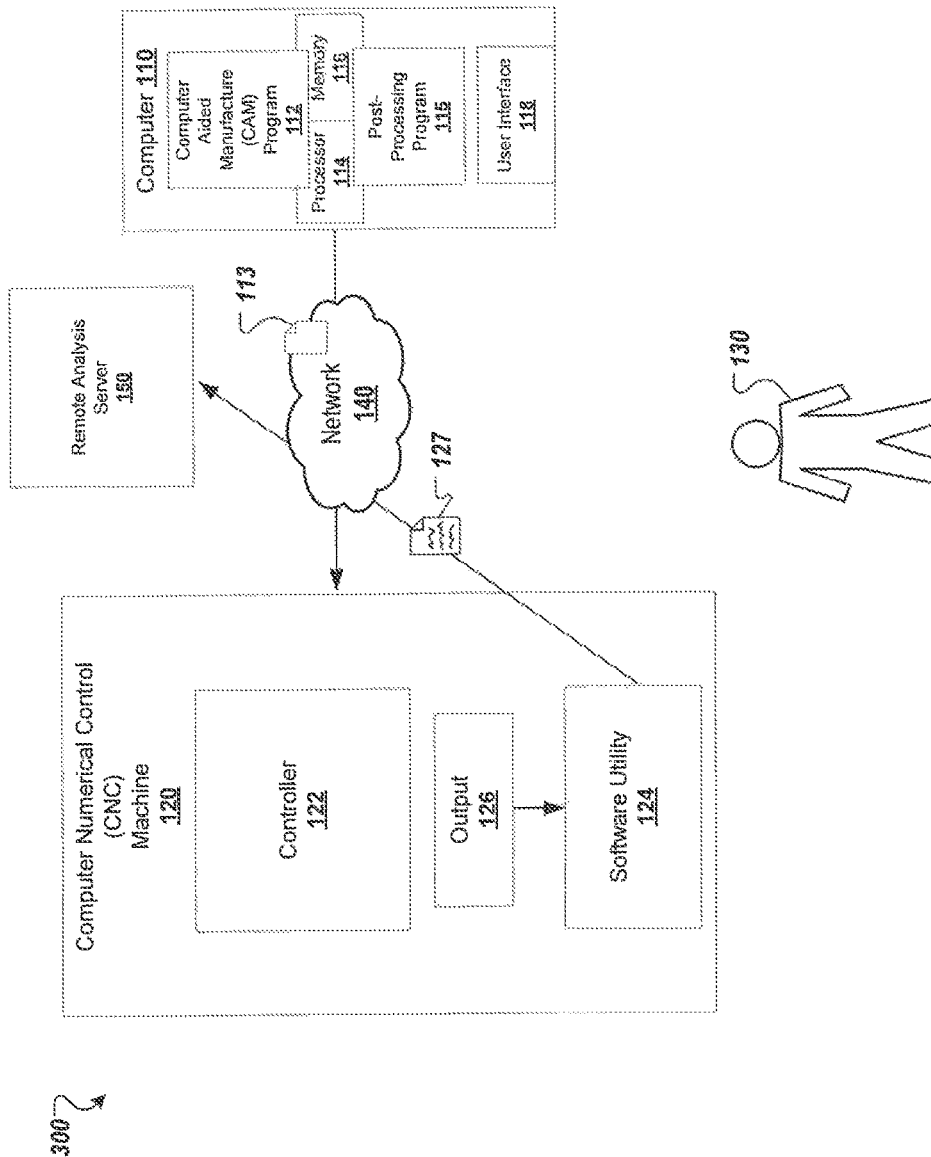
FIG. 3 shows an example of a system for outputting data from a CNC machine to a remote server for analysis.

FIGS. 1-3 show examples of a system for outputting data from a CNC machine to a local utility software program for processing. FIG. 1 shows a first embodiment of a system 100. FIG. 2 shows a second embodiment of a system 200. FIG. 3 shows a third embodiment of a system 300. A CNC machine 120 includes a controller 122 and an output 126. A local utility program 124 can be used with the CNC machine 120 to access, parse, and format data output by the CNC machine 120. The CNC machine 120 is communicatively connected to a computer 110 through a network 140.

The computer 110 includes a processor 114 and a computer-readable medium, such as a memory 116, a storage device, or both, to store instructions of one or more computer programs 112 and 115 that run on the processor 114. The processor 114 can be one or more hardware processors, which can each include multiple processor cores. The memory 116 can include both volatile and non-volatile memory, such as Random Access Memory (RAM) and Flash RAM. The computer 110 can include various types of computer storage media and devices, which can include the memory 116.

The CNC machine 120 can include its own computer 110 with the CAM program 112, the processor 114, the post-processor 115, the memory 116, etc. For example, in some implementations, the computer 110 and the CNC machine 120 can be integrated together, without a network 140 connecting them. Alternatively, the CNC machine 120 can simply be the machine tools and other manufacturing components that are controlled by the controller 122, and one or more remote computer systems, which are accessible by the computer 110 via the network 140, which can include Computer Aided Design (CAD) programs and Computer Aided Engineering (CAE) programs used to generate models that are input to and processed by the CAM program 112 and the post-processing program 115.

A computer program 112 can present a graphical user interface (GUI) on a display device of the computer 110, which can be operated using one or more user interface 118 input devices of the computer 110 (e.g., keyboard and mouse). The computer program 112 can be a Computer Aided Manufacture (CAM) program which receives, as input, a model generated by a CAD program and/or a CAE program on a separate computer. The CAM program 112 generates the tape file that controls the CNC machine 120.

The CAM program 112 allows a user 130 to interact with a model of a particular part to be manufactured by the CNC machine 120 and readily generate an NC program that is written to a tape file provided to the controller 122. The CAM program 112 can receive a 3D model with the 3D geometry of a work piece. Using the geometry, the CAM program 112 generates an NC program by assigning spindle speed and/or feed rate parameters at each point from hundreds of points that make up a tool path, or the path that the tip of a cutting tool follows to remove material from stock material to machine a work piece. The CAM program 112 uses these assigned parameters to generate NC programs.

The post-processing program 115 receives the data defining NC programs from the CAM program 112 and translates data defining the NC programs into machine language recognized by the CNC machine 120, or post-processes, the NC programs (e.g., a tape file). The computer 110 can provide the NC program tape file 113 to the CNC machine 120 through the network 140. In order to interface with multiple types of CNCs, the CAM program 112 and the post processing program 115 can determine the file format used by the CNC machine. The tape file 113 is generated based on the detected file format used by the CNC machine 120 and is executed by the controller 122 to control the machine tools of the CNC machine 120. In some implementations, the post-processing program 115 is integrated into the CAM program 112. Instructions written to a tape file cause the controller 122 to control the CNC machine 120 to produce a particular work piece according to an NC program.

The CNC machine 120 is a machining apparatus that includes one or more computer controlled machine tools. These can include, but are not limited to, all types of milling cutter tools, including those with ball nose, tapered, tip radius and barrel geometries. In addition, the CNC machine 120 can include other components and systems, such as rotatable platforms/attachments (e.g., for five-axis milling processes) and fluid dispensing systems (e.g., sprayed water cleaning systems and lubrication systems).

The controller 122 controls the machine tools of the CNC machine 120. Using NC program instructions provided in a tape file, the controller 122 controls various aspects of the machine tool, including the position, spindle speed, and feed rate. The tape file can include instructions, or markers, that cause the CNC machine 120 to output data through the output 126 (e.g., an output port or output file).

The software utility 124 is a computer program that obtains output data from the CNC machine 120 and can parse, reformat, and provide the output data for further processing. Output data from CNC machines is generally text data consisting of sets of characters and symbols that are not readily digestible by a human CNC operator or analyst. The systems 100, 200, and 300 facilitate adding markers to tape files provided to CNC machines to cause the CNC machines to output additional data beyond what is normally output by a CNC machine when executing a traditional tape file. Particular data may be requested for analysis or automatically provided by the software utility 124 for processing. The software utility 124 can access data output by the CNC machine and detect the particular data requested, which can include the additional data. The software utility 124 can then parse the output data to obtain the requested data. In some examples, a computer or program to which the software utility 124 can provide the requested data requires a particular format. The software utility 124 can reformat the data as needed, and in such cases, the software utility 124 can determine the format required and reformat the data before providing the data to the computer or program.

The software utility 124 can be compatible with many different CNC machines, and can retrieve and parse data from different types of CNC machines by detecting the originating data format used by the CNC machine 120 and using the detected data format used by the CNC machine 120 to parse the output data. The software utility 124 can then format the data according to one or more parameters and provide the formatted data for processing. The software utility 124 can provide the formatted data to a remote system, such as a computer or a server for analysis, or to a program that generates NC programs to be executed by the CNC machine 120. In some examples, the software utility 124 can process the output data, generate a report from the analysis, and provide the report to a remote device, such as a mobile device of a user so that the data is easily understood by an operator or other user of the systems 100, 200, or 300.

For example, the CNC machine 120 may output data in a format where several digits are used to describe the spindle speed and feed rate, as well as the next set of coordinates relative to machine zero (the origin of the coordinate system of CNC the machine). One digit is used to describe the tool pocket of the machine tool being used, and several characters are used to describe the type of parameter indicated or the type of machine operation being performed. In such an example, a line of output from the CNC machine 120 can read as follows: s4000f200x-12.2y7.0z0.012t2fp, and can be deciphered as such: spindle speed 4000 revolutions per minute (RPM), feed rate 200 inches per second (ips), x coordinate −12.2, y coordinate 7.0, z coordinate 0.012, finishing pass. In another example, a line of output from the CNC machine 120 can indicate the time and date and a program point reached: 201704052102pointten. However, these outputs can be confusing and difficult to decipher without consulting a manual or table of values.

The software utility 124 can determine, based on data provided by a user of the system 100, 200, or 300, the manufacturer and model number of the CNC machine 120 to identify the data format used by the CNC machine 120. The software utility 124 can also receive input mapping particular symbols or data portions to meanings. For example, a user can input or import a table mapping portions of output data from the CNC machine 120 to parameters indicated by the respective portions. Upon identifying the data format used by the CNC machine 120, the software utility 124 can then parse the output data and reformat the output data for processing.

The CAM program 112 can receive, through the user interface 118, user input that indicates one or more parameters from a user 130 of the system 100, 200, or 300. The user 130 can specify what data the CNC machine 120 should output to output 126. For example, an operator who wishes to monitor a particular tool path he suspects to be taking longer to execute than he predicted can request that operating data relating to the particular tool path is output by the CNC machine 120. The operator can provide, for example, the identifier for the particular tool path and the specific operating parameter, such as spindle load and machine tool temperature to define the requested data.

The CAM program 112 can make changes to an NC program for the next time the job is run, and the changes can include adding data to the NC program (e.g., markers on the tape file) that cause the CNC machine 120 to output the requested data as specified by the one or more parameters received through the user interface 118.

In some implementations, the CAM program 112 can automatically determine data to be output by the CNC machine 120. For example, the CAM program 112 can determine, based on various factors including historical use data or current operating parameters of the CNC machine 120, what data to cause the CNC machine 120 to output. The CAM program 112 can also use default settings or data gathering profiles to determine what data the CNC machine 120 should output.

In some implementations, the software utility 124 includes a user interface through which the software utility 124 can receive one or more parameters from a user of the system 100, 200, or 300 that determine what data the CNC machine 120 is to output. For example, the software utility 124 can be used with a display of the CNC machine 120 and can receive user input from an operator of the CNC machine 120 with data the operator would like to see from the CNC machine 120 at runtime. The software utility 124 can format the user input and provide data to the CAM program 112 to indicate instructions to be inserted into the NC program (e.g., markers to be inserted in the tape file).

The software utility 124 gathers the output data from the output 126 and, according to the determined data format used by the CNC machine 120, parses and reformats the data for processing. The processing can include providing, for display to an operator, the data. The software utility 124 can receive, from a user, input indicating an output format for the data that the software utility 124 provides for processing. For example, the user can provide input indicating that the data output should be formatted into columns in an .xls file and can specify the column names, the number of entries, significant figures, etc.

In some implementations, the output 126 can be a data output port through which the CNC machine 120 can provide operating data. The output port 126 can be internal to the CNC machine 120, such as an internal data bus, or a physical, external port through which the CNC machine 120 can provide data to a remote system. The software utility 124 can access data output through the output port 126, for example, by being communicatively connected to the CNC machine 120. The software utility 124 can interface with many different types of CNC machines, for example, by receiving data directly through an internal bus. The software utility 124 can be used with various appropriate data ports that interface with the CNC machine 120 and the output port 126.

In other implementations, the output 126 can be a file to which data is written. The output file 126 can be stored in a local memory of the CNC machine 120, or data can be written directly to a particular location in the local memory of the CNC machine 120. The output file 126 can be accessed by the software utility 124 or provided to the software utility 124 through a data port of the CNC machine 120. The software utility is compatible with many types of CNC machines, and can detect the format of the output file 126, as described above.

The network 140 can be a private network, a public network, a virtual private network, etc. The network 140 can be a local area network (LAN), a wide area network (WAN), the Internet, or a combination thereof. The network 140 may include 802.11 Wi-Fi wireless Ethernet (e.g., using low-power Wi-Fi chipsets), Bluetooth, networks that operate over AC wiring, or Category 5 (CAT5) or Category 6 (CAT6) wired Ethernet network. The network 140 connects the CNC machine 120 to the computer 110 and allows data transfer between the CNC machine 120 and the computer 110.

Manufacturing of even a simple work piece can include multiple tool paths and sub-tool paths. Different tool paths can each require different cutting tools, and therefore a tool change. Traditional CNC machines receive and run tape files until the end of the tape file is reached without providing insight into the progress of the machining. However, operating conditions that can arise, such as overheating and deformation of stock material, improper pass sizes, or tool deflection, can affect the timeline of the machining process and the integrity of the final product. Without the ability to monitor and account for such operating conditions, traditional machining techniques can be inefficient and unpredictable. Moreover, it can be costly to re-manufacture work pieces that are machined out of specification, as new stock material must be purchased in addition to labor and revenue lost to continued use of the CNC machine.

In some situations, a CNC machine operator would like a status update on a particular machining process, or job, at particular intervals. For example, the CNC machine operator may need to check tolerances on a work piece after each sub-tool path in an NC program, and in order to pause the CNC machine, the operator may want to receive an alert that a particular sub-tool path has finished. In some situations, the operator may want to know what the current temperature of the work piece and the cutting tool are in order to manage coolant dispensation, or loads on the machine tool in order to determine whether certain feeds or speeds need to be adjusted. However, existing methods of providing status information to the operator are expensive to implement and generally require integrating a proprietary system with the controller 122 of the CNC machine 120; in many cases, the proprietary systems are not compatible with the controllers of older CNC machines.

The software utility 124 can facilitate making changes to an NC program by analyzing data output by the CNC machine 120 while executing the NC program and can communicate with the CAM program 112 to alter the NC program. The insertions or alterations to the NC program (e.g., the tape files) include instructions that cause the CNC machine 120 to output data. Such insertions, or markers, allow a tape file to detect an event, enhancing the usability of the entire system 100, 200, or 300 by allowing an operator to determine when particular portions of a tape file have been reached. For example, an operator can be alerted when a particular tool change occurs so that he can monitor the tool change to ensure that a delicate sub-tool path is properly completed.

The CNC machine 120 outputs data including operating parameters, such as the current portion of the tool path that the CNC machine 120 has reached, the spindle speed, or whether coolant is flowing. By monitoring operating parameters and providing the parameters for processing, the software utility 124 allows an operator of the CNC machine 120 to be informed of the progress of the NC program currently running. Additionally, the software utility 124 provides the operator with an opportunity to correct for or react to changes to operating conditions that occur over the course of the machining process.

By providing control data to the CAM program 112, the software utility 124 can facilitate dividing NC programs, and therefore tape files, into segments. Once these segments are created, each segment can be more easily modified or replaced relative to modifying an entire tape file. The software utility 124 provides the output data for processing by various systems.

Referring now to FIG. 1, the software utility 124 parses output data from the CNC machine 120, and selects particular data from the output data. The software utility 124 can select particular types of data based on one or more parameters. For example, the software utility 124 can receive parameters from the CAM program 112 indicating the data to be selected from the output data provided by the CNC machine 120. The software utility 124 may automatically determine data to be output by the CNC machine 120. For example, the software utility 124 can determine, based on various factors including historical use data or current operating parameters of the CNC machine 120, what data to cause the CNC machine 120 to output. The software utility 124 can also use default settings or data gathering profiles to determine what data the CNC machine 120 should output.

The software utility 124 can select data from the output 126 and perform analysis on the data. For example, the software utility 124 can analyze the output data to identify a machine event. Machine events can be changes in operating conditions or status of the NC program. For example, if a sub-tool path has been completed or if a threshold operating temperature of the spindle has been reached, the software utility 124 can determine that there is a machine event. The software utility 124 can generate, based on the analysis, a report 125 and provide the report to a remote device 145, such as a mobile device of the user 130.

The software utility 124 can use historical data received from the CNC machine 120 to identify a machine event by comparing particular operating parameters and determining whether a threshold difference in a particular parameter value has occurred. Each machine event can have a particular type that is associated with a particular action. For example, each machine event type can be mapped to a particular work flow or action to be taken in order to address the machine event. The mappings between event types and actions can be stored within a database or memory that can be accessed by the software utility 124.

Once the software utility 124 has determined the type of an identified machine event, the software utility 124 determines whether the type of the machine event requires an action to be taken in order to address the machine event. For example, the software utility 124 can access a database in which mappings between event types and actions are stored, and determine that a machine event indicating that the endmill used for roughing the work piece is deflecting and the roughing passes are not removing enough material. The software utility 124 can then determine, based on a mapping between a deflection event and a spindle speed increase action, that the spindle speed needs to be increased. In some implementations, the software utility 124 can calculate the increase in speed needed, and in others, the software utility 124 can receive a spindle speed or difference in spindle speed from a resource, such as a database or a remote system.

The software utility 124 can provide feedback, including control data, to the CAM program 112 to alter tape files provided to the CNC machine 120. Such alterations include instructions beyond those that cause the CNC machine 120 to output data through the output port 126. For example, the software utility 124 can provide feedback to the CAM program 112 that causes the CAM program 112 to alter a tape file with instructions to perform a tool change. The software utility 124 can provide control data to the CAM program 112 that causes the CAM program 112 to stop providing a particular tape file to the controller 122 and instead provide the controller 122 with an entirely new tool path indicated by a new tape file.

As described in FIGS. 2 and 3, the software utility 124 can be a program that has, for example, a small memory footprint, or low complexity, and can be referred to as a "simple" software utility that merely parses, reformats, and transmits data without performing additional processing. The simple software utility 124 does not require extensive computing resources, and can be used with older CNC machines.

Referring now to FIG. 2, the software utility 124 can parse and format data from the output 126. The software utility 124 can then provide the formatted data 127 to the CAM program 112 for processing. Such output data acts as feedback from the CNC machine 120, as the CAM program 112 can alter the NC program to accommodate changes in operating conditions. The CAM program 112 can alter the NC program so that the changes are executed the next time the NC program is run. In some implementations, the CAM program 112 can alter segments of the NC program tape file such that changes to the NC program are executed before the job associated with the NC program is completed.

In the system 200, the CAM program 112 can process the operating data from the software utility 124 to identify machine events or determine changes that need to be made to a tape file provided to the controller 122. For example, the CAM program 112 can determine, based on the geometric model of the work piece and the NC program, that the current tool path is the fourth tool path out of fifteen tool paths needed to complete the job. The CAM program 112 can then provide, either to the software utility 124 or to a remote device, data indicating that the job is 27% complete.

The CAM program 112 can determine, based on data from the software utility 124, that a change to the NC program needs to be made. The CAM program 112 can receive data from the software utility 124 indicating the change, or the CAM program 112 can calculate the changes to be made to the NC program based on the data received from the software utility 124. For example, the software utility 124 can provide data to the CAM program 112 that the machine tool spindle is using only 40% of its maximum power. The CAM program 112 can then provide control data to the post-processing program 115 to insert instructions into the tape file that increase the feed rate. The tape file is then provided to the controller 122.

The CAM program 112 can store the output data from the software utility 124 and integrate the operating parameters associated with a particular job or machine with known parameters generated by an NC program to create a cutting profile. For example, the CAM program 112 can gather values for various factors including the manufacturer of the CNC machine 120 so that a computer, such as the computer 110, can access machine-specific manuals and parameters or contact the manufacturer. The geometry of the work piece at various stages of completion can be used by the CAM program 112 to monitor the progress of the job. The geometry of the starting piece of stock material is used by the CAM program 112 when generating the NC program to calculate the roughing tool paths, and can be used by the CAM program 112 as a reference point. Operating parameters specific to the CNC machine 120 set during the installation and/or commissioning of the CNC machine 120 can be used to compensate for machine-specific imperfections and to calculate offsets to be used in NC programs run on the particular CNC machine 120. The CAM program 112 can use the relative number of hours the CNC machine 120 has been operated to calculate typical wear and drift of the machine tools in order to compensate for changing operating conditions over the lifetime of a CNC machine 120. Manual interactions between the operator and the CNC machine 120 can be used by the CAM program 112 to monitor the efficiency and accuracy of the NC programs generated. For example, if an operator consistently reduces spindle speed throughout a particular tool path in a job, the CAM program 112 can recognize the pattern and adjust the NC program for the job.

Cutting profiles can be specific to a particular machine, a particular make of machine, a particular job, or even to a particular tool pocket. For example, a cutting profile can be created for a particular machine on the shop floor that has made the same work piece for 10 years. A cutting profile can also be created for a tool pocket that has been drifting one thousandth of an inch to the right of machine zero every year.

Creating specific cutting profiles tailored to each machine or job allows the CAM program 112 to accurately simulate the machining process. Traditional methods for simulating the machining process assume ideal machining conditions for each tool path, tool, and work piece. Generally, machining simulations provided by existing CAM programs do not account for factors unique to each machine, and estimates for job completion can be inaccurate, causing frustration for the operators and clients who commission the jobs.

In some examples, a cutting profile for a particular CNC machine or job is overlaid on a tape file. The CAM program 112 is able to adjust a tool path defined in an NC program at creation or during runtime to compensate for the operating conditions unique to the particular CNC machine or job being executed. Because the cutting profile is continually updated through data gathered by the software utility 124 and provided to the CAM program 112, the cutting profile iteratively improves the accuracy of future machine simulations and NC programs.

When the CAM program 112 alters an NC program during runtime, the CAM program 112 can account for certain factors that are not evident at the time of creation of the tape file or cutting profile. For example, a fastener failure in tool pocket number three may not be obvious until a fly cutter in tool pocket number three is used at a sufficiently high spindle RPM such that the fly cutter begins to deflect from the work piece. The software utility 124 can provide data from the CNC machine 120 that indicates the unusual load pattern at the spindle to the CAM program 112, and the CAM program 112 can determine that there is an unforeseen operating condition that requires human intervention. The CAM program 112 can then write a stop command to the tape file and immediately halt the machining process while providing output data indicating that a machine failure has occurred.

The CAM program 112 is also able to determine status updates and generate and update projected finish times for a job based on the improved simulation of the machining process. In some implementations, the CNC machine 120 includes coordinate measuring machine (CMM) functionality, and can check the progress and accuracy of an NC program by measuring the dimensions of a work piece and comparing the measured dimensions to a simulated model work piece.

The software utility 124 does not require costly hardware integration, as it alters the tape file and not the operation of the controller 122 itself. By detecting the type of tape file and compatible set of instructions used by the controller 122, the software utility 124 provides backwards compatibility with the wide range of machines that operate using tape files. In some examples, the software utility 124 is able to generate and alter physical tape files read by early models of CNC machines and provides valuable tools for improving the machining process to operators of even the most dated machines for which propriety software offering the same functionality is not available.

Additionally, by providing operating data before the completion of a work piece, the software utility 124 delivers feedback to an operator during the process of machining. For example, an operator can be notified that a particular tool path is taking longer than previously calculated, and the estimated time to completion for a particular work piece can be adjusted.

For example, an operator can receive CAD data for a new part that needs to be machined. The operator imports the CAD geometry and manually selects the types of strategies and parameters that should be used to machine that part. A CAM program, such as the CAM program 112 can create a number of tool paths using various tool path algorithms and predict how long the tool paths will take to run on a particular CNC machine based on the programmed tool paths and selected parameters. The operator provides the generated tool paths to a post-processor which generates tape files from the tool paths. During the post-processing, the post-processor may insert extra commands to create a log file on the CNC machine that records when each tool path starts and ends. The tape files are run on the CNC machine, and while the machining commands are performed, the CNC machine also executes the embedded commands to log the start and stop times of each tool path. The simple utility 124 can gather the log data from the CNC machine, parse the data, reformat the data for transmission, and provide the data to the CAM program 112. The CAM program 112 can then revise its record of how long the particular NC program takes to run. In some examples, the CAM program 112 uses machine learning models to detect patterns in machining strategies used and time predictions in order to provide better estimates whenever that type of tool path is created in the future. For example, if all machining strategies of type A seem to take 30% longer than predicted, the CAM program 112 can build that into the future predictions for the particular CNC machine 120.

A shop manager may spend a significant amount of time manually checking on operators to determine the progress of a particular job in order to keep clients appraised of the situation. In another example, each job in the shop may be manufactured according to a work flow as follows. An operator receives CAD data for a new part that needs to be machined and imports the CAD geometry into the CAM program 112. The operator manually selects the types of strategies and parameters that should be used to machine that part and the CAM program 112 creates a number of tool paths that each contain markers at particular points throughout the tool path. For example, there can be a marker at 5% complete, 10% complete, etc. based on simulation time estimates for a particular job. The CAM program 112 can access the total number of tool paths required to complete the particular job, and the identifiers for each tool path. The operator then provides the tool paths for post-processing to generate tape files. During the post-processing, the post-processor may insert extra commands to indicate operating data, such as the tool path name and markers that indicate when the tool path is 5% complete, 20% complete, etc. to create a log file on the CNC machine 120 noting when each tool path starts and ends. The tape file is then provided to the CNC machine 120, and when the controller 122 runs the tape files, other embedded control data are executed, and the CNC machine 120 outputs data indicating the name of a current tool path when the tool path is run and markers indicating the progress of the tool path. The software utility 124 gathers the output data from the CNC machine 120 and can parse, reformat, and transmit the data to the CAM program 112. The shop manager can then access the CAM program 112 at any time to see the progress of the CNC machine 120, what tool path is being executed, etc. without having to call the operator for the CNC machine 120. The shop manager can also get an accurate estimate of when the job will be completed based on the data collected by the software utility 124.

In yet another example, a CNC operator can perform hybrid manufacturing by combining subtractive and additive manufacturing techniques, such as by machining a three-dimensional (3D) printed part. Generating a 3D printing path for a CNC machine is a complex process that involves constantly varying parameters that change values throughout the programmed path. Many laser systems used for additive manufacturing have "closed-loop" feedback systems to monitor the printing process and adjust the printing path and parameters as the printing occurs. If, for example, a batch of 10 identical jobs is run, and the first job is run on closed-loop feedback, the CNC machine 120 may make adjustments during the printing process that would be advantageous to implement in the printing path generated by a 3D printing program that generates the printing path. In some examples, the CAM program 112 can generate both 3D printing paths and machine tool paths, and the CAM program 112 is used as the 3D printing program. The 3D printing program can then provide the adjusted NC program to the controller 122 instead of relying on the CNC machine 120 to consistently perform the same adjustments within the closed-loop feedback system.

In such an example, the operator can receive CAD data for a new part that needs to be manufactured using both 3D printing and machining. The operator imports the CAD geometry into a 3D printing program and selects build strategies and provides estimates for important printing parameters, such as laser power, powder volume, etc. The 3D printing software generates a number of printing paths, each of the paths containing additional parameter information, such as the laser power. The operator then provides the CAD geometry and 3D printing paths to the post-processor to generate tape files. The operator runs the 3D printing paths and any tool paths generated by the CAM program 112 on the CNC machine 120. The CNC machine 120 with 3D printing functionality can make adjustments to the printing path during the printing process based on operating parameters being monitored. For example, the CNC machine 120 can adjust the laser power in a particular area of the job because not enough material is being melted. The software utility 124 gathers the data indicating the adjustments made by the CNC machine 120 and compares the adjustments with the generated printing and tool paths to alter the programs based on the adjustments made for future use on the CNC machine 120.

Furthermore, the software utility 124 is able to annotate, parse, and format output data before providing the data for processing. The software utility 124 facilitates adding instructions to a tape file that are not necessarily executed by a machine tool of the CNC machine 120. Such additional instructions can extend the functionality of a tape file by pointing to additional information or instructions at a particular point in a tool path. For example, a particularly complex tool path can be annotated with a line by line description of the intended operations in order to assist an operator with verifying that the tool path has been properly executed. In another example, a particular CNC machine manufacturer may introduce a variable that is not used by other makes or models of CNC machines, and embedded data in a tape file can indicate that the variable can be processed as intended if present, and ignored if it is not used in the tape file.

In some implementations, the CAM program 112 can generate, based on the data from the software utility 124, a representation of the simulation of the machining process. The CAM program 112 can then display the representation through a medium accessible to an operator of the CNC machine 120. For example, a video of the simulated tool path or the actual encoded instructions on the tape file can be displayed on a display of a computer of the operator. In other examples, an audible description of the tool path can be provided through speakers of the computer, or particular instructions can be displayed as text on the display.

Referring now to FIG. 3, the software utility 124 can provide formatted output data 127 to a remote analysis server 150 through the network 140. The remote analysis server 150 is communicatively connected to the computer 110 and can use one or more machine learning models to analyze data received from the software utility 124. The analysis server 150 can identify sub-optimal operating conditions of a CNC machine and determine whether a correction needs to be made to the tape file currently being run. For example, an operator may have chosen a sub-optimal setting for how the machine tool starts to engage with the stock, such as the ramp or lead-in moves performed by the machine tool. If the initial engagement between the cutting tool and the stock is too fast, the forces on the machine tool will be very high and there can be excessive wear on the cutting tool. The cut can however continue without causing catastrophic damage, and it is possible for the machine tool operator may ignore the transient problem. Using the data collected and a machine learning algorithm, the remote analysis server 150 can predict such problem areas of the toolpath and suggest more gradual ramps into the stock which will be less damaging.

The remote analysis server 150 receives various operating parameters in the output data from the CNC machine 120. For example, the remote analysis server 150 can receive output data indicating the stock material used for the work piece. The remote analysis server 150 can use the material of the work piece to identify optimal operating temperatures at which the material will not deform, appropriate tooling, and proper feed rates and spindle speeds, and can provide annotations that assist an operator with determining whether the CNC machine 120 is operating normally. For example, the remote analysis server 150 can provide data to the CAM program 112 with annotations to be included in the tape file that describe the tool path and what typical execution on a stainless steel work piece should look and sound like.

The remote analysis server 150 can receive information about the amount of load the spindle of the CNC machine 120 is under. For example, the remote analysis server 150 can determine, based on output data received from the software utility 124, that the CNC machine 120 is under 150% of its normal load, and that the unusually high load is only experienced in certain areas of a toolpath. The remote analysis server 150 can use one or more machine learning models to recognize load patterns and determine that the cutting tool is deflecting in the areas experiencing high load because not enough coolant is being directed to that portion of the work piece and the material is overheating. The machine tool may also be damaged by high loads, and typical damage includes wear on the bearings, motors and gearing which move the machines axes. The remote analysis server 150 can then select an action to be taken to correct for the deflection. For example, the remote analysis server 150 can recognize that in similar situations, a human operator usually directs coolant to the area of the work piece at which the spindle is experiencing high loads.

The software utility 124 and its use with the CNC machine 120 provides a method for gathering and feeding back the current status and performance of an NC program run by a CNC machine. By having the post-processor 115 include additional logging commands in the tape file, it is possible to generate a log output of the machine operation whilst the program is running on the machine. The output can provide information about when an NC program starts and ends. For example, if there are multiple tool paths, the software utility 124 can parse and reformat the output data to provide an operator with the start and end times of each tool path or sub-tool path.

The software utility 124 can gather data about what cutting tool is being used by the CNC machine 120. For example, if the CNC machine 120 performs a tool change and uses the high speed steel (HSS) two-flute endmill in tool pocket four, the software utility can parse and reformat the output data from the CNC machine 120 to inform an operator of the tool change.

Because the software utility 124 does not require complex software modifications to the controller 122 or hardware additions to the CNC machine 120, the software utility 124 provides functionality for monitoring and altering operation of the CNC machine 120, before completion of a machining job, usable with most CNC machines. The software utility 124 provides this additional functionality without hardware additions, and improves the efficiency and accuracy of machining by learning from historical data and corrections applied to tool paths and operating parameters of the CNC machine 120.

Figure 4:
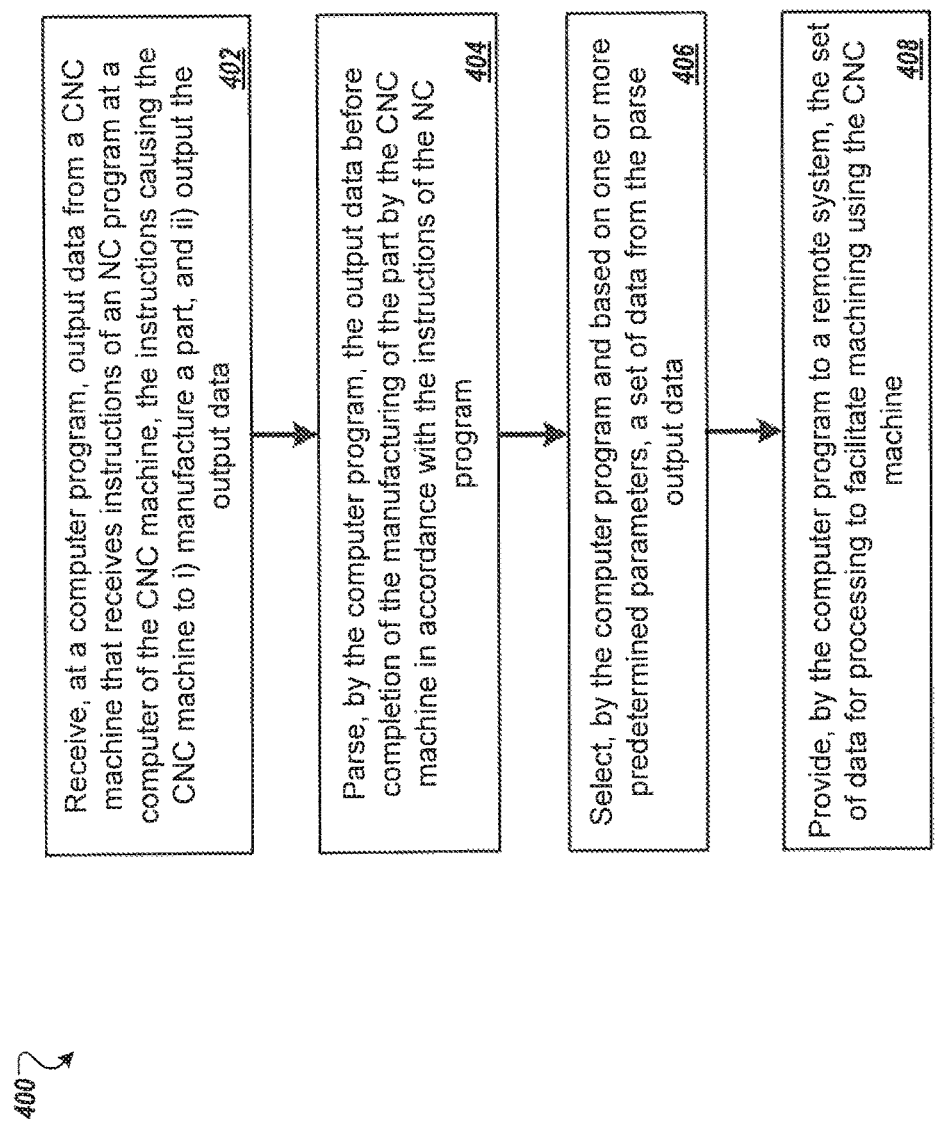
FIG. 4 shows a flow diagram of an example method for providing output data from a CNC machine for processing.

FIG. 4 shows a flow diagram of an example method 400 for providing output data from a CNC machine for processing. For example, the method 400 can be used for providing output data from the CNC machine 120 within any of the systems 100, 200, or 300 described above with reference to FIGS. 1-3. The method 400 can be used, for example, in the manufacture of various work pieces and can be used with conventional machining as well as hybrid machining and 3D printing.

A computer program, e.g., the software utility 124, receives output data from a CNC machine, e.g., the CNC machine 120, that receives instructions of an NC program that cause the CNC machine to i) manufacture a part, and ii) output the output data at a computer of the CNC machine (402). For example, referring to FIG. 1, the software utility 124 can receive output data containing text data from the CNC machine 120 through the output port 126. The software utility 124 can also access an output file 126, for example, by accessing a particular memory location at which the output file 126 is stored.

The computer program parses the output data before completion of the manufacturing of the part by the CNC machine in accordance with the instructions of the NC program (404). For example, the software utility 124 can determine that the CNC machine 120 outputs data using a particular format. Using the determined format, the software utility 124 can parse the output data to identify and record parameter values.

The software utility 124 parses the output data and, in reformatting the data, encapsulates the data such that data output by various CNC machines can be easily processed by a remote system or human user reviewing the output data. For example, the software utility 124 can format output data in the form of text readily understood by a machine such that an operator on the shop floor can receive and digest the data to improve programming of the particular job associated with the data by selecting different parameters for running the NC program or making live adjustments to the NC program.

The output data can be output by the CNC machine 120 based on markers inserted into the tape file. Each of the markers can have an identifier that is used to match specific measurements with an exact location within the CAM program 112. The identifiers for the markers, or instructions, are used to match specific measurements with the exact location in internal data structure of the CAM program 112 which generated the cutting move which was being executed when the measurement was taken. For example, a marker that causes the CNC machine 120 to output spindle load at a particular point in a toolpath can have an identifier that corresponds to an identifier within the CAM program 112 at 20% through the toolpath. Matching the marker identifier to an identifier within the CAM program 112 at 20% through the toolpath indicates that the spindle load was output by the CNC machine 120 20% through the toolpath, and allows a user to pinpoint the exact time that the spindle load measurement was taken.

Using the system 100, a user is able to select when data is output by the CNC machine 120. For example, a user can specify to the software utility 124 that the spindle speed and temperature of the machine tool should be output by the CNC machine 120 at the beginning of a particular toolpath so that the user can monitor how much load the CNC machine 120 is experiencing at the beginning of the particular toolpath. Because users are able to specify where markers are placed and the timing of measurements taken by the CNC machine 120 instead of waiting for data to be collected periodically, fewer computer resources are required to collect the data, and more precise measurements can be taken. For example, the spindle may experience a large amount of force when first engaging with the work piece at the beginning of a toolpath. If data is collected periodically, it is possible that spindle load at the moment of contact will not be measured. If, instead, data is collected at specific points in time, spindle load can be measured and output by the CNC machine 120 at the moment of engagement of the machine tool with the work piece.

The computer program selects, based on one or more predetermined parameters, a set of data from the parsed output data (406). For example, a user of the system 100, 200, or 300 can provide parameters indicating the type of data the CNC machine 120 should output, such as the spindle speed, the temperature of the machine tool, the sub-tool path currently running, etc. As described above with respect to FIGS. 1-3, an operator of the CNC machine 120 can provide a machining profile to the CNC machine 120 that specifies particular parameters and properties of an NC program or of the CNC machine 120 itself that are used by the software utility 124 to determine data to be output by the CNC machine 120.

A CNC machine logs various data during operation and can output the data to a log file, such as the output file 126. This log data traditionally includes operational data, such as the type of tool path being taken, that a user may not wish to see. The software utility 124 can select the set of data based on the one or more parameters to reduce storage and transmission resources used.

The CNC machine 120 can use markers on tape files to determine what parameters to output. These markers, as described above, have identifiers that correspond to particular locations within the CAM program 112. The markers can also be used to select a set of data from the parsed output data. For example, the software utility 124 can determine, based on the identifiers of the markers, which measurements to output in a report. In such an example, a user can input to the software utility 124 a set of data he would like to view, such as the spindle load at the beginning of each toolpath. The CNC machine 120 could have output the spindle load at the beginning, 50% point, and end of each toolpath, generating more data than the user wishes to see. The software utility 124 can then select, based on the user's input and the identifiers for the markers, only those data points that correspond to the spindle load at the beginning of each toolpath.

The logged data can include various parameters, such as spindle load, operating temperature of a machine tool, or the status of a manual override to the CNC machine 120. The CNC machine 120 can log when an operator 130 of the CNC machine 120 manually overrides the tape file being read by the controller 122. The manual override data can be flagged by markers, as described above, that have identifiers that correspond to particular locations within the CAM program 112. For example, if the operator 130 of the CNC machine 120 overrides the feed rate of the spindle at the 35% point of a particular toolpath, the manual override data can be flagged by a marker that has an identifier that corresponds to the 35% point of the particular toolpath. When reviewing the log data, the manual override data can then be correlated with the particular locations within a toolpath of the CAM program 112 at which the operator 130 manually overrode the tape file instructions.

The computer program then provides, to a remote system, the set of data for processing to facilitate machining using the CNC machine (408). For example, once the software utility 124 has identified the appropriate data to be provided and formatted the data for processing, the software utility 124 can provide the data to the CAM program 112 or the remote analysis system 150 for processing. For example, the software utility 124 can identify particular operating parameters, such as the spindle load and operating temperature, at a particular sub tool path, that have been requested for output by an operator of the CNC machine 120 and provide the operating parameters for processing to the CAM program 112. The CAM program 112 can then process the provided operating parameters, for example, by generating a report for displaying on the computer 110.

In some implementations, such as those described with respect to FIG. 1, the software utility 124 can perform analysis on the set of data and generate a report based on the analysis. The software utility 124 can then provide the report to a remote device, such as the remote device 145, or an operator of the CNC machine 120 or another user of the system 100, 200, or 300, such as a shop floor manager who oversees multiple operators and jobs.

The software utility 124 can format the output data for ease of use by presenting the data using various types of graphics. For example, the software utility 124 can color code and shade different portions of data graphics or charts within a report generated from the data provided to the software utility 124. In such an example, the software utility 124 can generate a line graph displaying load on the CNC machine 120 against lines of the NC program to show where the CNC machine 120 was under high load, where the CNC machine 120 was running at optimal load, where the CNC machine 120 was not working hard at all, etc.

Traditional NC programs are purely plain text and do not contain image or video data. In contrast, in some implementations, the software utility 124 can present the output data in various visual presentation formats. Because the software utility 124 parses output data from the CNC machine 120 and can reformat the data before providing the data for processing, the software utility 124 may process embedded data that includes more complex data or pointers to a location where the additional data is stored in order to provide image or video functionality. For example, an NC program may contain a link to a video of a simulation for the current tool path being run by the CNC machine 120. The software utility 124 may then parse the output data from the CNC machine 120 to identify the location of the linked video and display the video to an operator while the tool path is executed by the CNC machine 120. The software utility 124 improves efficiency of the machining process as operators can easily identify areas for improvement and understand the options available to make improvements to the NC program.

In some examples, processing can include writing the output data to a file. For example, the software utility 124 can provide the data to the computer 110 for writing to a file stored on the computer 110. In some examples, the software utility 124 can provide control data to the CAM program 112 that directly alter the NC program.

The software utility 124 can provide the data to a remote device, such as a user device or a display on the CNC machine 120 that is visible to an operator 130. For example, the software utility 124 can provide formatted data including image data of a new tool to be set up by the operator 130 to a mobile device of the operator 130, such as a smartphone. The software utility 124 can communicate with remote devices through the network 140 or through a physical communication port, similar to the output port 126.

In some examples, the processing can include generating a simulation of the job. For example, the software utility 124 can provide data to the CAM program 112 that generates a 3D representation of the tool paths being executed at the time. By using output data from the CNC machine 120 during execution of an NC program, the software utility 124 provides improved accuracy of timeline estimates compared to estimates generated using ideal operating conditions that do not account for various factors unique to the CNC machine 120.

Figure 5:
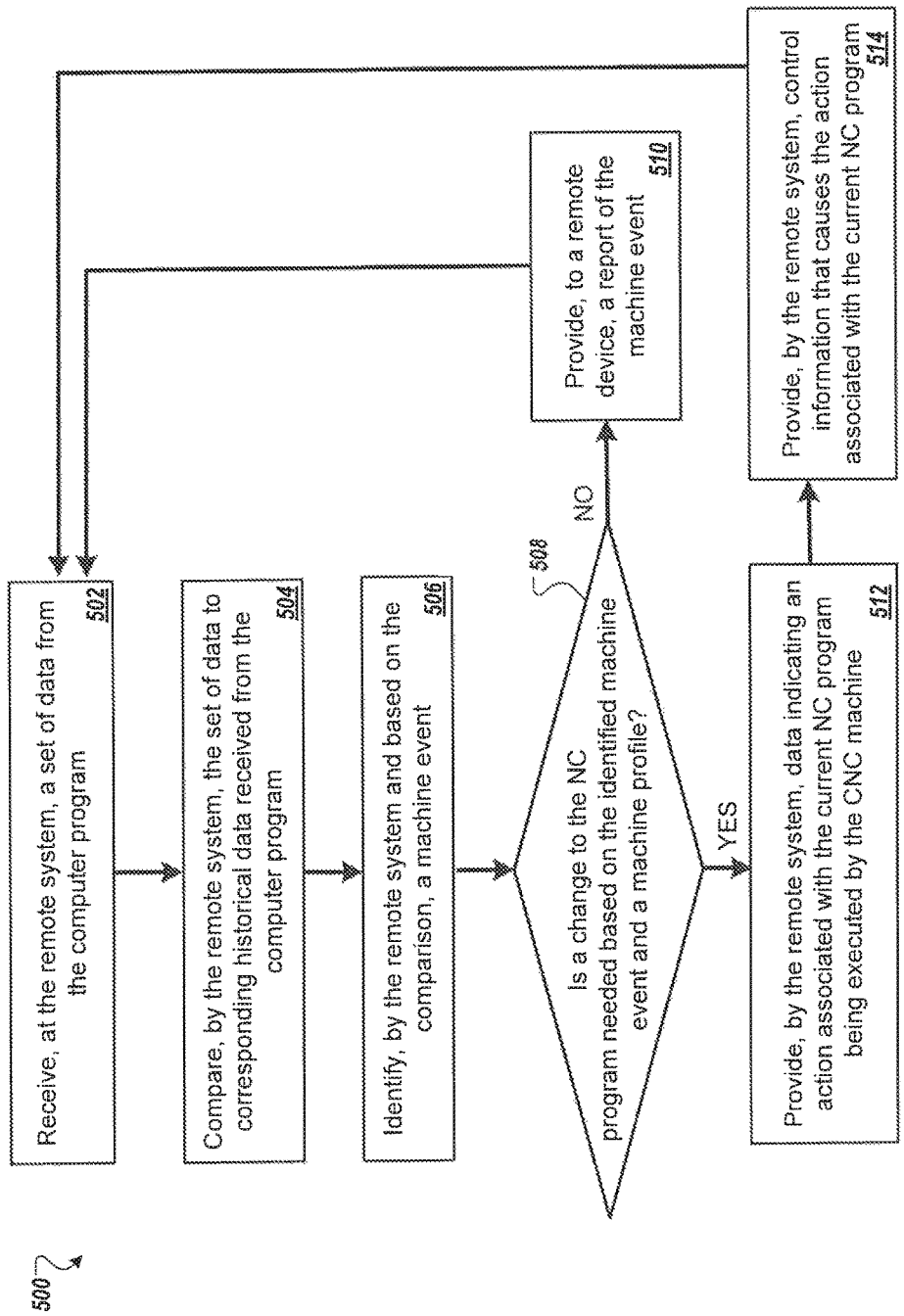
FIG. 5 shows a flow diagram of an example method for performing an action based on output data from a CNC machine prior to completion of a machining job.

FIG. 5 shows a flow diagram of a process 500 for performing an action based on output data from a CNC machine prior to completion of a machining job. For example, the method 500 can be used for performing an action related to the CNC machine 120 within any of the systems 100, 200, or 300 described above with reference to FIGS. 1-3. The method 500 can be used, for example, in the manufacture of various work pieces and can be used with conventional machining as well as hybrid machining and 3D printing. While the CAM program 112 or the remote analysis server 150 can perform the method 500, the method 500 is described with respect to the CAM program 112 for simplicity, and the remote analysis server 150 can include all functionalities described below with respect to the CAM program 112.

A remote system, such as the CAM program 112 or the remote analysis server 150, receives a set of data from the computer program, e.g., the software utility 124 (502). For example, the CAM program 112 can receive formatted data from the software utility 124 containing current operating parameters of the CNC machine 120.

The remote system compares the set of data to corresponding historical data received from the computer program (504). For example, the CAM program 112 can access a memory, such as the memory 116, to identify historical output data received from the software utility 124.

The remote system identifies, based on the comparison, a machine event (506). For example, the CAM program 112 can compare the received data with the historical output data using one or more machine learning models. The CAM program 112 can be trained to recognize different machine events such as tool deflection, work piece deformation, high load on the CNC machine, etc. For example, the CAM program 112 can recognize a low load event indicating that the spindle is operating at a low spindle load, and may thus be producing a poor surface finish.

The machine learning models can be any of a variety of models, such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using various approaches, such as deep learning, perceptrons, association rules, inductive logic, clustering, maximum entropy classification, learning classification, etc. The CAM program 112 can use unsupervised or supervised learning.

In some examples, the CAM program 112 can detect inconsistencies and abnormal events based on the received data and historical data. For example, the CAM program 112 can evaluate the received data and compare the received data to historical data to assign one or more abnormality scores to the received data for each machine event detected. The CAM program 112 can then output an event report based on the assigned abnormality scores and determine, using the event report, that an aberration has occurred. In such an example, the machine event is determined to be an abnormal machine event. For example, if there is suddenly no load on the spindle but the tool path continues to be executed by the CNC machine 120, the CAM program 112 can determine that an abnormal event has occurred (e.g., the cutting tool has snapped off).

The remote system determines, based on the machine event and a machine profile, whether a change to the NC program is needed (508). As described above with respect to FIGS. 1-3, an operator of the CNC machine 120 can provide a machining profile to the CNC machine 120 that specifies particular parameters and properties of an NC program or of the CNC machine 120 itself that are used by the software utility 124 to determine data to be output by the CNC machine 120. The software utility 124 can provide the machining profile to the CAM program 112, which uses the provided machining profile to determine corrections or adjustments to a tool path, a machining strategy when generating an NC program for the particular job, etc.

In some examples, the CAM program 112 can access the profile from a memory, such as the memory 116, or receive the profile as input. In some cases, the CAM program determines, based on the identified low load event and a profile received for the CNC machine 120 that indicates that NC programs run on the CNC machine 120 are generally altered such that all feed rates are increased during a particular sub-tool path, that the NC program needs to be altered such that feed rate is increased to increase spindle load to optimal spindle load and improve surface finish of the work piece during the particular sub-tool path the next time the NC program is run.

In some examples, the CAM program 112 can determine that no change to the NC program is required. Some machine events do not require intervention and can be simply informative machine events or machine events for which no correction can be made. For example, the CAM program 112 can determine that an ahead of schedule event has occurred, and no change to the NC program is required. The CAM program 112 can determine that a new tool path has started, and no change to the NC program is required.

There are various actions related to the CNC machine 120, and actions do not necessarily require making a change to the NC program or tape file. The computer program can, instead, provide a report of the identified machine event (510). For example, an action can include providing, to a remote device, a notification that a particular machine event has occurred. For example, a partial completion job machine event can occur, and the software utility 124 can provide the data indicating that the job is partially complete to the CAM program 112. In such an example, the CAM program 112 can then display a notification on a display, such as the user interface 118, of the computer 110 notifying a user, such as the operator 130, that the machining process is 30% done, or any of various levels of completion that have been designated for providing output indicating the progress of the machining process.

In some examples, the action can include providing an improved estimate of the progress of a particular job. For example, when the CAM program 112 generates the NC program, the CAM program 112 can generate an estimate of three hours to complete the job, and that the fourth tool path out often tool paths is the 25% marker, as each tool path has a different run time. The software utility 124 provides output data from the CNC machine 120 to the CAM program 112, which generates an updated estimate. The CAM program 112 can determine, from the data provided by the software utility 124, that the CNC machine 120 is executing the fourth tool path of ten tool paths, and run time is at two hours. Because the CNC machine 120 has only reached the 25% marker and is already at two hours, the CAM program 112 can determine that the job is behind schedule, and can generate an updated time estimate for completion of the job.

Once the remote system has reported the machine event to a remote device, such as an operator's mobile phone, the remote system continues the process 500 by receiving another set of data from the computer program (502). The remote system constantly receives data from the computer program, and the process 500 continues as long as the machining process continues.

If, however, the remote system has determined that a change to the NC program is needed, the remote system provides data indicating an action associated with the current NC program run by the CNC machine (512).

In some examples, using previously described methods of adding output commands to an NC program using the software utility 124 and the CAM program 112, the controller 122 or a computer, such as the computer 110, can be triggered to display appropriate information (image, video, audio, control data, etc.) related to that particular phase of the manufacturing job. This data can be recalled from the CAM program 112, or from a remote storage location. For example, when the CNC machine 120 runs a program, each time a tool change is the next command, the NC program can contain a command to retrieve and display an image of the dimensions of the new tool or instructions on how the operator should set the tool up before the CNC machine 120 begins using the tool. In another example, before machining a particular feature of the part, the NC program can include a command to present a video explaining to the operator how the feature will be machined, or where to set the datum of the CNC machine 120. Data output from the CNC machine 120 can be simple data, such as a single text string, that is mapped to more complex data (e.g., images or video) or longer commands within a storage device, such as a remote server communicably connected to the CAM program 112 and the software utility 124.

An operator of the CNC machine 120 can intervene with execution of an NC program when necessary. For example, if the work piece is too hot and there is visible deflection of the cutting tool, the operator can increase coolant flow or reduce feed rate of the tool. In such an example, the software utility 124 can provide data to a remote analysis system 150 that determines, based on the operator's history of intervening at a particular tool path to decrease feed rate, that the NC program for the job should be altered to reduce feed rate at that portion of the tool path. In some examples, the remote analysis system 150 can determine, based on machine load, that the CNC machine 120 did not run at programmed speeds indicated by the tape file, and can automatically detect that human intervention occurred.

In some implementations, the action can include outputting event data to an operator of the CNC machine. For example, the computer program can provide live data streaming (e.g., showing the current NC program line by line) to a remote device with a display. The operator 130 can view the stream of the NC program being run and know exactly what line in the NC program the CNC machine is currently running.

In some implementations, the action includes outputting a suggestion or a warning to the operator 130 of the CNC machine 120. CNC machines typically have a manual override for the feed rate. This allows the operator to reduce the feed rate if he thinks the machine tool is under too much load. The status of the manual override is a parameter which can be monitored by the software utility 124 and provided to the CAM program 112. For example, if the data output from the CNC machine 120 indicates that the operator manually reduced the feed rate, the CAM program 112 can determine that the original feed rate dictated by the CAM program 112 was too high. The one or more machine learning models of the CAM program 112 can be trained using the features described above to predict the value of the manual override for the feed rate. Such features include, for example, the stock material, the type of machine tool being used and characteristics of the machine tool including the make and model number, the cutting tool being used and characteristics of the cutting tool such as the geometry of the cutting tool, the material of the cutting tool, the coating used on the cutting tool, the coolant being used and characteristics of the coolant, such as the thermal conductivity, viscosity, and flow rate, the toolpath geometry and characteristics of the toolpath, such as the curvature of the toolpath, and volume of material removed at every point in the toolpath.

Once trained, the CAM program 112 can monitor new jobs and predict when a manual feed rate override will be necessary. The system can then warn the CAM operator and suggest a lower feed rate value.

In another example, the CAM program 112 can receive data indicating the amount of time the CNC machine 120 took to complete a particular job. The CAM program 112 can also determine whether the manual feed rate override was used, or the machine was stopped due to breakage of a cutting tool. If, in such an example, the machine did not need to be slowed or halted then the CAM program 112 can classify the cut as "successful." Then, when the operator generates the NC program for a new job, the CAM program 112 can check for previous jobs which have been run using the same or a similar set up with the same cutting tool, the same stock material, etc. The CAM program 112 then compares the current feature set with all previous similar jobs which have been run, and if a similar job has been run "successfully" using a higher feed rate, the CAM program 112 can determine that the higher feed rate can be made available to the operator 130 as a recommendation. The CAM program 112 can also determine whether changing one or more of the parameters used by the CAM system resulted in "successful" cuts which executed in a shorter time than the parameters used by the operator 130 and then recommend similar changes to the parameters to the CAM operator.

In another example, the CNC machine 120 can measure the load applied to the spindle for a large proportion of points on a tool path for some cutting tools. Spikes in the spindle load should be avoided as they can reduce tool life and are the most likely time for tool breakage to occur, and different parameter settings in the CAM program 112 can reduce these spikes in spindle load. When the operator 130 creates an NC program for a new job, the CAM program 112 can identify similar jobs and determine whether the similar jobs gave rise to spikes in the spindle load. If the CAM program 112 can identify alternative parameter settings which did not give rise to spikes in spindle load, the alternative settings can be recommended to the CAM operator.

In general, spindle load is approximately proportional to the amount of material being removed at any position in a tool path. The amount of material being removed can be computed by the CAM program 112. In some situations, however, unexpected loads are applied to the spindle. By comparing the volume of material removed at every point in the tool path with the actual measured spindle load, the CAM program 112 can build a model to predict the scenarios in which unexpected spindle loads occur. The machine learning models of the CAM program 112 can be trained using the features described above and also "time series" data for the volume of material removed at each point along the tool path. Various other factors can be provided as input to the machine learning models, such as engagement angle of the cutting tool. The CAM program 112 can be trained to predict the actual spindle load from such input. Then, when the operator 130 generates a new NC program, the spindle load can be predicted, and recommendations can be made to the operator 130 for changes in NC program parameters to avoid spikes in the predicted load.

The action can be performed in response to receiving user input, and in some examples, the software utility 124 can receive a request for reporting data from a remote client device, such as an operator's smart phone. In response to receiving the request, or upon determining that a predetermined period of time has passed (e.g., a setting requires a status update every fifteen minutes), the software utility 124 can then transmit reporting data to the remote client device. The reporting data can include a progress status of the NC program. For example, the software utility 124 can provide status updates upon request or at predetermined intervals to a remote device.

In some examples, the software utility 124 can perform the action in response to either receiving a request for reporting data from a remote client device or receiving alert data from the CNC machine 120. In response, the software utility 124 can transmit the reporting data, which can include a feed rate of the CNC machine 120, a spindle speed of the CNC machine 120, and/or a status of coolant use by the CNC machine 120, to the client device. The reporting data can also include tooling data for the CNC machine 120 or stock material data of the work piece being machined by the CNC machine 120.

In some examples, the action can include automatically determining, based on the received data and historical output data as well as historical operator behavior data, tool paths and strategies for machining a particular 3D geometry. In such an example, the CAM program 112 can account for various factors, including whether a set of parameters broke any cutting tools, induced spikes in spindle load, or executed within a predetermined period of time.

The remote system then provides control information that causes the action associated with the current NC program (514). For example, the CAM program 112 can generate control information and provide, to the post-processor 115, the control information to make changes to the NC program tape files. The remote analysis server 150 can generate control information and provide the control information to the CAM program 112, causing the CAM program 112 to make adjustments to the NC program.

In some examples, when patterns emerge, the remote system can perform actions automatically. For example, if spindle speed and coolant flow rate are always increased when machining stainless steel, the CAM program 112 can adjust default settings within the CAM program 112 itself to account for such changes. In some examples, the software utility 124 can apply corrections where a user, such as an operator of the CNC machine 120, can see the feedback and make to both the planning and the programming process of machining, as well as make adjustments through the CAM program 112 or the post-processor 115 to the NC program.

The remote system can detect problems while the CAM operator calculates the toolpaths in the CAM system. If patterns emerge which indicate that there might be a problem, the remote system can alert the CAM operator so that the operator is warned, and a remedy may be suggested. The CAM operator can make the final decision on any changes to the tape file.

In some implementations, however, increasing coolant flow or other simple operations can be performed in real time if the temperature of the tool starts to rise outside certain limits.

Once the remote system has provided the control information that causes the action associated with the current NC program, including making the change to the NC program, the remote system continues the process 500 by receiving another set of data from the computer program (502). The remote system constantly receives data from the computer program, and the process 500 can continue for as long as the machining process continues.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Thus, particular embodiments of the invention have been described. Other embodiments are within the scope of the following claims. In addition, the actions recited in the claims can be performed in a different order and still achieve desirable results.

What is claimed is:

1. A method comprising:
   receiving, at a computer program and during the execution of a Numerical Control (NC) program, output data from a Computer Numerical Control (CNC) machine that receives instructions of the NC program at a computer of the CNC machine, the instructions of the NC program causing the CNC machine to i) manufacture a part, and ii) output the output data in a detected output format of the CNC machine;
   parsing, by the computer program and based on the detected output format of the CNC machine, the output data before completion of the manufacturing of the part by the CNC machine in accordance with the instructions of the NC program;

selecting, by the computer program and based on one or more predetermined parameters, a set of data from the parsed output data; and providing, by the computer program to a remote system, the set of data for processing to facilitate machining using the CNC machine, wherein the CNC machine is caused to output the output data by output commands inserted into the NC program by a Computer Aided Manufacturing (CAM) program that generates the instructions of the NC program, the output commands including identifiers that (i) appear in the output data and (ii) are used to match specific output data to exact locations within the CAM program that generated the output commands; and wherein the selecting comprises selecting the set of data from the parsed output data in accordance with requested data included in the output data responsive to the output commands inserted into the NC program by the CAM program.

2. The method of claim 1, wherein the computer program is a simple software utility that i) runs on the CNC machine, and ii) communicates with a Computer Aided Manufacturing (CAM) program that generates the instructions of the NC program.

3. The method of claim 1, wherein the remote system is a computer system that runs the CAM program that generates the instructions of the NC program.

4. The method of claim 3, comprising:
providing, by the computer program and to the CAM program, control information to cause the CAM program to insert the output commands into the NC program.

5. The method of claim 1, wherein the remote system is a server; and
wherein the processing comprises analysis of the set of data.

6. The method of claim 1, wherein the data is output to a file.

7. The method of claim 1, wherein the data is output through a data output port of the CNC machine.

8. The method of claim 1, wherein the parsing of the output data is performed as the output data is received; and
wherein providing the set of data for processing comprises reformatting, by the computer program, the set of data into a detected format used by the remote system.

9. The method of claim 1, wherein the set of data includes reporting data.

10. The method of claim 9, comprising:
receiving, by the computer program, a request for the reporting data from a remote client device; and
in response to at least one of receiving the request or determining that a predetermined period of time has transpired, transmitting, to the remote client device, the reporting data, wherein the reporting data includes a progress status of the NC program.

11. The method of claim 9, comprising:
receiving, by the computer program, at least one of: a request for the reporting data from a remote client device or alert data from the CNC machine; and
in response to receiving at least one of: the request or the alert data, transmitting, to the remote client device, the reporting data, wherein the reporting data includes at least one of: a feed rate of the CNC machine, a spindle speed of the CNC machine, or a status of coolant use by the CNC machine.

12. The method of claim 9, comprising:
receiving, by the computer program, at least one of: a request for the reporting data from a remote client device or alert data from the CNC machine; and
in response to receiving the request, transmitting, to the remote client device, the reporting data, wherein the reporting data includes tooling data of the CNC machine.

13. The method of claim 9, comprising:
receiving, by the computer program, at least one of: a request for the reporting data from a remote client device or alert data from the CNC machine; and
in response to receiving the request, transmitting, to the remote client device, the reporting data, wherein the reporting data includes stock material data of the part being manufactured by the CNC machine.

14. The method of claim 1, comprising:
receiving, from a user, one or more types of data to be output by the CNC machine; and
determining, by the computer program and based on the one or more types of data, the one or more predetermined parameters used to select the set of data from the parsed output data.

15. A system comprising:
one or more computers programmed to generate a Numerical Control (NC) program to (i) manufacture a part using a Computer Numerical Control (CNC) machine and (ii) to provide output data related to the manufacturing of the part in a detected output format of the CNC machine; and the CNC machine configured to run the NC program, wherein instructions of the NC program cause the CNC machine to manufacture the part and to provide the output data;

wherein the CNC machine comprises one or more storage devices encoding instructions of an additional computer program that runs on the CNC machine, parses, based on the detected output format of the CNC machine, the output data before completion of the manufacturing of the part by the CNC machine in accordance with the instructions of the NC program, selects a set of data from the parsed output data based on one or more predetermined parameters, and provides the set of data to a computer remote from the CNC machine for processing to facilitate machining using the CNC machine, and wherein the CNC machine is caused to output the output data by output commands inserted into the NC program by the one or more computers programmed to generate the NC program, the output commands including identifiers that (i) appear in the output data and (ii) are used to match specific output data to exact locations within an internal data structure of the one or more computers that generated the output commands; and wherein the selection comprises selection of the set of data from the parsed output data in accordance with requested data included in the output data responsive to the output commands inserted into the NC program by the one or more computers programmed to generate the NC program.

16. The system of claim 15, wherein the computer remote from the CNC machine analyzes the set of data using machine learning, detects a machine event based on the analyzing, and provides data indicating the machine event to the additional computer program.

17. The system of claim 16, wherein the analyzing comprises:
- evaluating, based on historical output data from an output port of the CNC machine received from the additional computer program, the set of data;
- assigning, based on the evaluation, one or more abnormality scores to the set of data for each of one or more events indicated by the set of data; and
- outputting, based on the assigned one or more abnormality scores for each of the one or more events indicated by the set of data, an event report,
- wherein the detecting comprises determining, using the event report, that an aberration has occurred, wherein the machine event is an abnormal machine event.

18. The system of claim 16, wherein the computer remote from the CNC machine is an analysis server.

19. The system of claim 15, wherein the additional computer program is a software utility that communicates with a Computer Aided Manufacturing (CAM) program that generates the instructions of the NC program.

20. The system of claim 15, wherein the computer remote from the CNC machine is a computer that runs a Computer Aided Manufacturing (CAM) program that generates the instructions of the NC program.

* * * * *

UNITED STATES PATENT AND TRADEMARK OFFICE
CERTIFICATE OF CORRECTION

PATENT NO. : 10,452,052 B2
APPLICATION NO. : 15/649530
DATED : October 22, 2019
INVENTOR(S) : Nathan David Rogers, Paul Wilkinson and Joseph George Lambourne Page 1 of 1

It is certified that error appears in the above-identified patent and that said Letters Patent is hereby corrected as shown below:

On the Title Page

Column 1, (73) Assignee: delete "San Rafaek," and insert --San Rafael,--, therefor.

Signed and Sealed this
Twenty-first Day of January, 2020

Andrei Iancu
*Director of the United States Patent and Trademark Office*